(12) United States Patent
Schellinger et al.

(10) Patent No.: US 6,360,091 B1
(45) Date of Patent: *Mar. 19, 2002

(54) METHOD AND APPARATUS FOR ESTABLISHING A COMMUNICATION LINK

(75) Inventors: Michael J. Schellinger, Vernon Hills; Robert F. D'Avello, Lake Zurich, both of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/693,494

(22) Filed: Aug. 2, 1996

Related U.S. Application Data

(63) Continuation of application No. 08/239,143, filed on May 6, 1994, now abandoned.

(51) Int. Cl.[7] .................................................. H04Q 7/20
(52) U.S. Cl. ...................................................... 455/403
(58) Field of Search ............................ 379/62, 60, 58, 379/57; 455/403

(56) References Cited

U.S. PATENT DOCUMENTS

| | | | | |
|---|---|---|---|---|
| 4,242,538 A | * | 12/1980 | Ito et al. | |
| 4,829,554 A | * | 5/1989 | Barnes et al. | 379/58 |
| 4,833,701 A | * | 5/1989 | Comroe et al. | 379/60 |
| 4,901,307 A | * | 2/1990 | Gilhousen et al. | 370/18 |
| 4,977,589 A | * | 12/1990 | Johnson et al. | 379/58 |
| 5,202,912 A | * | 4/1993 | Breeden et al. | 379/57 |
| 5,239,294 A | * | 8/1993 | Flanders et al. | 340/825.34 |
| 5,241,598 A | * | 8/1993 | Raith | 380/21 |
| 5,307,399 A | * | 4/1994 | Dai et al. | 379/57 |
| 5,325,419 A | * | 6/1994 | Connolly et al. | 379/60 |
| 5,329,573 A | * | 7/1994 | Chang et al. | 379/58 |
| 5,455,863 A | * | 10/1995 | Brown et al. | 380/23 |
| 5,488,649 A | * | 1/1996 | Schellinger | 379/62 |

OTHER PUBLICATIONS

Palmer, "The Wireless Loop" Telephony, Jun. 1996.*
European Technical Science Inst. "Recommendation GSM 08.08: Mobile Switching Centre (MSC) to Base Station System Interface; Layer 3 Specification", Feb. 1990.*

* cited by examiner

Primary Examiner—William Cumming
(74) Attorney, Agent, or Firm—John J. King; Daniel C. Collopy

(57) ABSTRACT

A method generally establishes a communication link in a communication system when a cordless base station has been authenticated to communicate with authorization equipment, and the authorization equipment has been authenticated to communicate with the cordless base station. Preferably, one or more random numbers are transmitted between the cordless base station and the authorization and call routing equipment to establish the communication link.

19 Claims, 11 Drawing Sheets

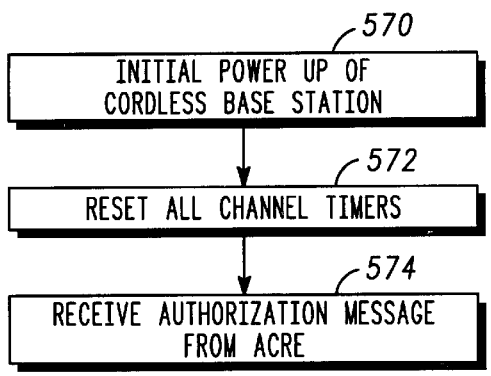
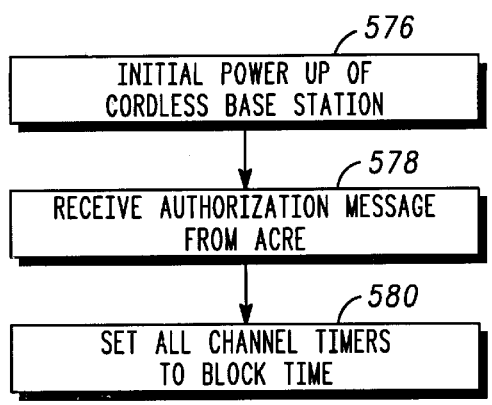
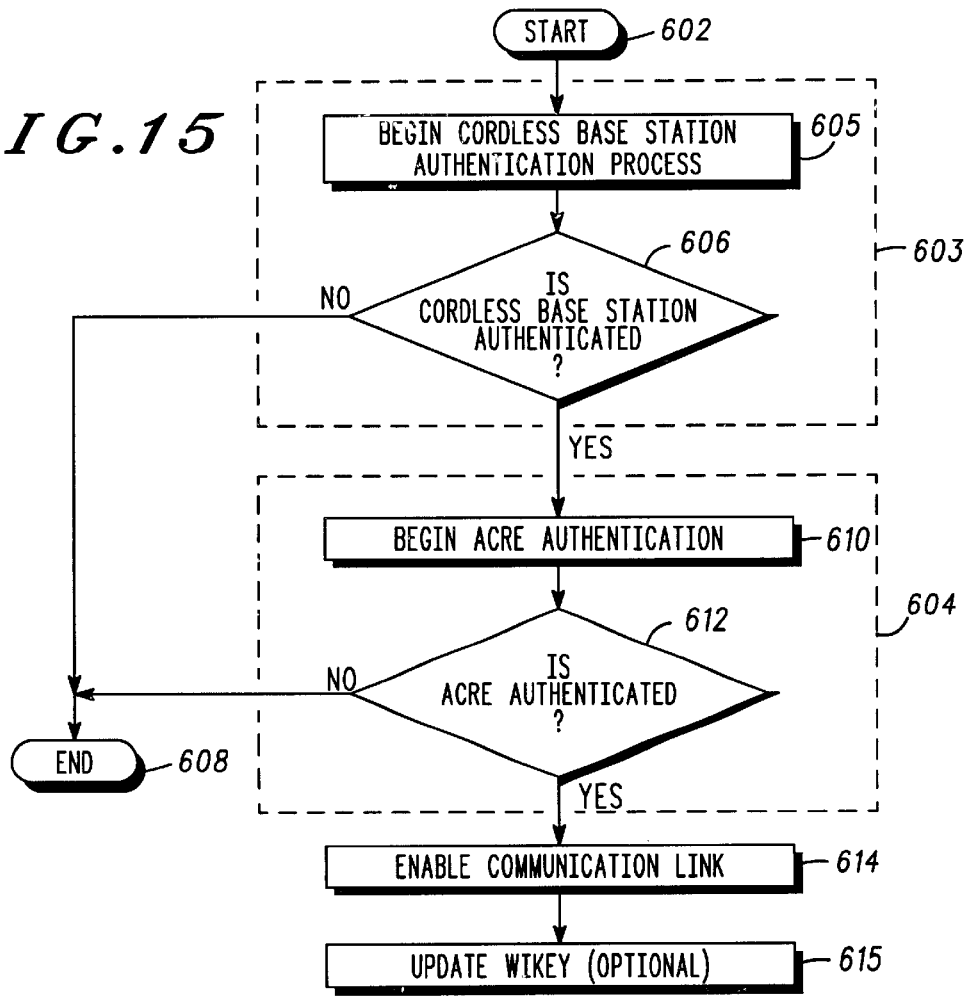

FIG. 21F

| 764 | 766 | 768 | 770 | 772 | 774 | 776 | 778 | 780 | 782 | 784 | 786 |
|---|---|---|---|---|---|---|---|---|---|---|---|
| ACRE AUTH. RESULTS | USAGE ALLOWED | SPECTRUM USAGE | USAGE DURATION | AUTH. INITIATION | RESERVED | INITIAL CHANNEL NUMBER | CHANNEL ALLOCATION ARRAY | MAX. CORDLESS BASE STATION RECEIVE SIGNAL STRENGTH | MAX. PCC RECEIVE SIGNAL STRENGTH | BLOCK TIME | MAX. CORDLESS BASE STATION TRANSMIT LEVEL |

| 788 | 790 |
|---|---|
| MAX. PCC TRANSMIT LEVEL | OPTIONAL PARAMETERS |

FIG. 21K

| 822 |
|---|
| RELEASE REASON |

FIG. 21I

| 804 | 806 | 808 | 810 |
|---|---|---|---|
| REGISTRATION TYPE | MIN | ESN | OPTIONAL PARAMETERS |

FIG. 21J

| 812 | 814 | 816 | 818 | 820 |
|---|---|---|---|---|
| PARAMETER TYPE | PARAMETER LENGTH | REGISTRATION TYPE | MIN | ESN |

US 6,360,091 B1

METHOD AND APPARATUS FOR ESTABLISHING A COMMUNICATION LINK

This is a continuation of application Ser. No. 08/239,143, filed May 6, 1994 and now abandoned.

FIELD OF THE INVENTION

The present invention relates generally to communication devices, and more particularly to a method for establishing a communication link between a communication device and authorization equipment.

BACKGROUND OF THE INVENTION

A cordless telephone system typically includes a portable cordless handset and a cordless base station connected to a telephone company phone system by telephone landlines. The cordless base station has an assigned landline telephone number that allows the user to place and receive calls using the cordless portable handset within a limited range of the cordless base station, such as in a home. However, due to their limited range, the cordless portable handset provides the user with relatively local radiotelephone communication.

Radiotelephone communication outside the range of the cordless telephone system may also be provided to the user via a cellular telephone system. A cellular telephone system typically includes cellular subscriber units (mobile or portable) and cellular base stations connected to the landline telephone system via one or more cellular switching networks. Each cellular subscriber unit has an assigned cellular telephone number that allows the user to place and receive calls within a widespread range of the cellular base stations, such as throughout a metropolitan area. However, the cost of using the cellular telephone service is much greater than the cordless telephone service.

A cordless communication system incorporating a portable cellular cordless (PCC) radiotelephone is shown. The PCC has the ability to communicate with a conventional cellular radiotelephone system, which has a plurality of cellular base stations, a microcellular base station, or a cordless base station, which provides private telephone line interconnection to the telephone network for the user of the PCC. The cordless communication system uses an authorization and call routing equipment to provide call routing information to a telephone switching system. Thus, the switching system automatically routes phone calls between the cellular, microcellular and cordless systems. The authorization and call routing equipment also authorizes the cordless base station to utilize channels. However, a problem exists for both the operator of the telephone network and the user of the PCC. In particular, the operator of the telephone network must ensure that a user of the PCC does not fraudulently access service in a system in which the user is not authorized to access. Similarly, the user of the PCC must ensure that the cellular system which is being accessed is not a fraudulent system (i.e. a system established by a fraudulent operator who is illegally utilizing spectrum).

Accordingly, there is a need for a method to effectively establish a communication link between a cordless base station and authorization and call routing equipment only when both the cordless base station and the authorization and call routing equipment have been authenticated to ensure that the PCC is allowed to operate on the communication system and the authorization and call routing equipment is allowed to allocate spectrum of the communication system.

BRIEF DESCRIPTION OF THE DRAWINGS

FIG. 13 is a flow chart the cordless base station of FIG. 4 may employ upon an initialization event.

FIG. 14 is a flow chart the cordless base station of FIG. 4 may employ upon an initialization event.

FIG. 15 is a general block diagram of a process for authenticating the cordless base station and ACRE.

DETAILED DESCRIPTION OF A PREFERRED EMBODIMENT

The method of the present invention generally establishes a communication link in a communication system. In particular, the method establishes a communication link between a cordless base station and the authorization and call routing equipment when the cordless base station has been authenticated to communicate with the authorization equipment and the authorization equipment has been authenticated to communicate with the cordless base station. Preferably, one or more random numbers are transmitted between the cordless base station and the authorization and call routing equipment to establish the communication link.

Figure 1:
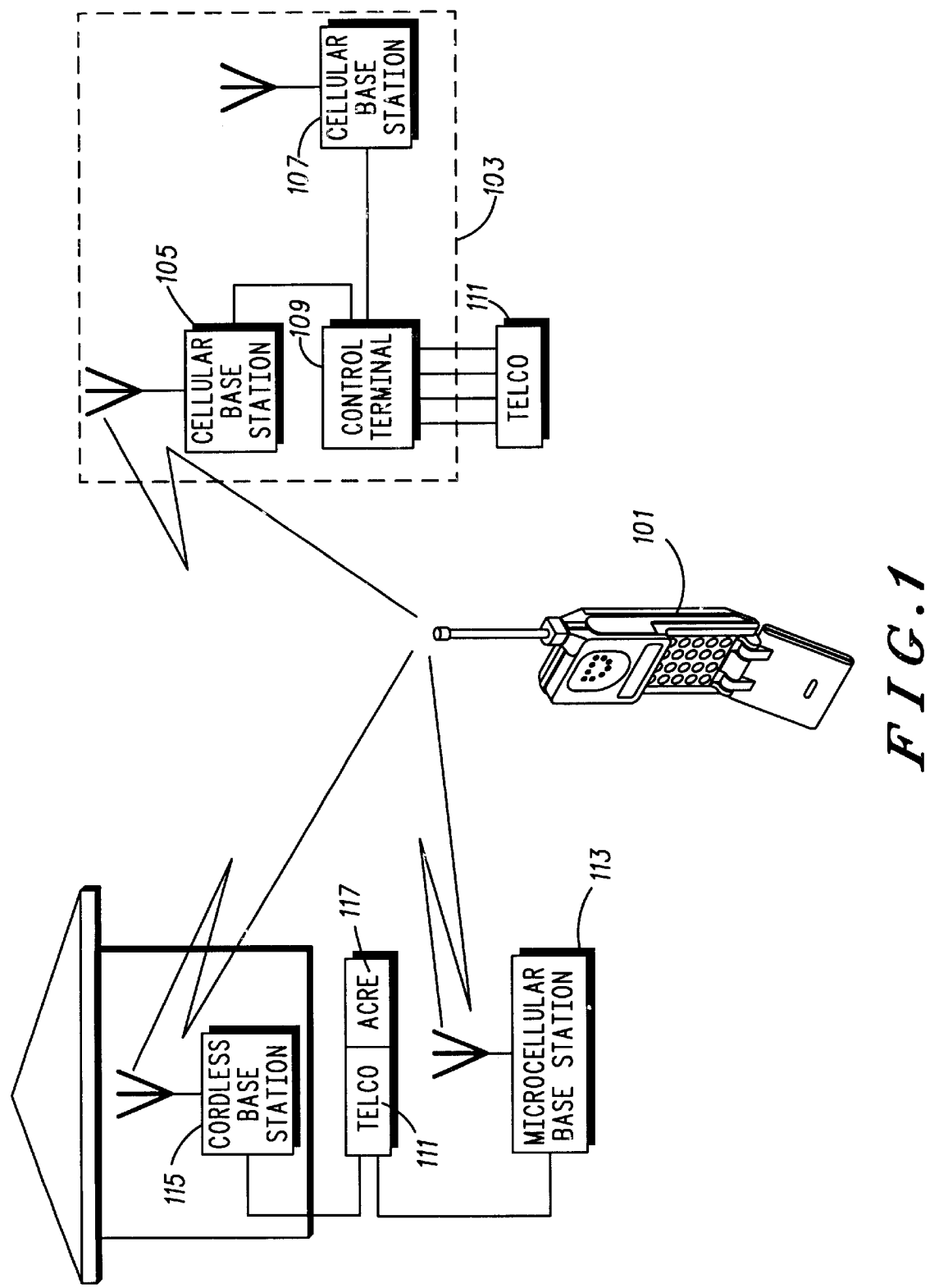
FIG. 1 is a block diagram of an operating configuration for a portable radiotelephone in which several systems, including both a cellular system and a cordless system, may be accessed by the same portable radiotelephone.

A generalized block diagram of an application of the present invention is shown in FIG. 1. A portable cellular cordless (PCC) radiotelephone 101 is shown having the ability to communicate with a conventional cellular radiotelephone system 103, which has a plurality of cellular base stations 105, 107 located at geographically separate locations but arranged to provide radiotelephone coverage over a wide geographic area. The cellular base stations are coupled to a control terminal 109 which provides coordination among the plurality of cellular base stations, including handoff of user cellular mobile and portable equipment, and provides call switching and interconnect to the public switched telephone network (identified hereinafter as "TELCO") 111.

The PCC 101 further has the capacity to communicate with a microcellular base station 113, which is a cellular adjunct cell having lower power and limited capabilities but providing public radiotelephone service to distinct areas such as shopping malls, airports, etc. The microcellular base station 113 is coupled to the TELCO 111 landline telephone system so that calls can be placed to the TELCO.

The PCC 101 further has the capability to communicate with and place radiotelephone calls via a cordless base station 115, which provides private telephone line interconnection to the TELCO 111 for the user of the PCC 101. The cordless communication system uses an authorization and call routing equipment (ACRE) 117 to provide call routing information to a telephone switching system. Thus, the switching system automatically routes phone calls between the cellular, microcellular and cordless systems. The ACRE 117 also authorizes the cordless base station 115 to utilize channels. The ACRE 117 can be part of the TELCO 111 or can be a stand alone device. As previously noted, the cordless base station 115 and the PCC 101 together provide the limited range radio service conventionally known as cordless telephone service. Such service has become pervasive, conventionally using a few radio frequency channels in the VHF (very high frequency) or UHF (ultra high frequency) radio bands.

The user of a radiotelephone should expect that radiotelephone service be available wherever he travels in the United States and that this service is provided at the lowest cost. It is also to be expected that radiotelephone service be provided in a portable unit that is as compact and inexpensive as possible. The PCC 101 is uniquely configured to meet this end. Furthermore, the cordless base station 115 is uniquely designed to provide telephone interconnect to the user's home telephone line when the user has the PCC 101 within the radio range of the cordless base station 115.

Figure 2:
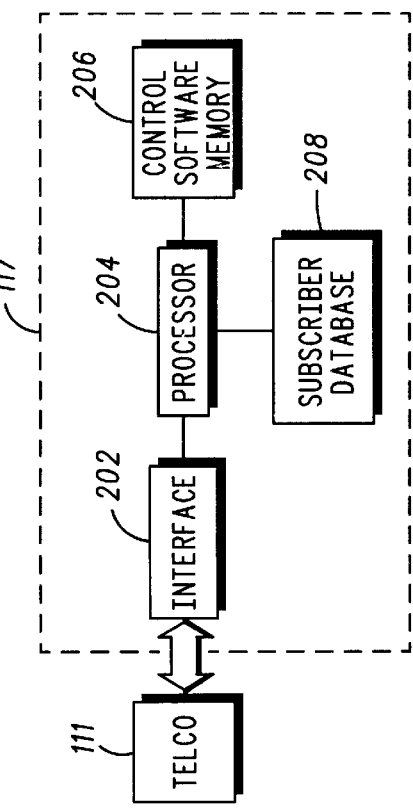
FIG. 2 is a block diagram of an authorization and call routing equipment (ACRE).

A block diagram of the ACRE 117 is shown in FIG. 2. The ACRE 117 is connected to a TELCO 111 by an interface 202. The interface 202 controls and formats messages between the TELCO 111 and a processor 204. The processor 204 in combination with a control software memory 206 is the intelligence of the ACRE 117 and performs authorization, and authentication tasks and provides call routing information. A subscriber database 208 contains the data required by the processor 204 in order to perform the tasks discussed above. The ACRE 117 can be separate from the TELCO 111 as shown in FIG. 2 or can be part of the TELCO 111, usually part of the switching equipment. When the ACRE 117 is part of the TELCO 111 the ACRE 117 may not need the interface 202. Additionally, the functions of the ACRE may be performed by existing equipment at the TELCO. Finally, according to some aspects of the present invention, the ACRE may only provide authentication functions and could be considered authentication equipment. While the following description refers generally to an ACRE, it will be understood the term ACRE could also be considered to describe authorization equipment depending upon the implementation.

Figure 3:
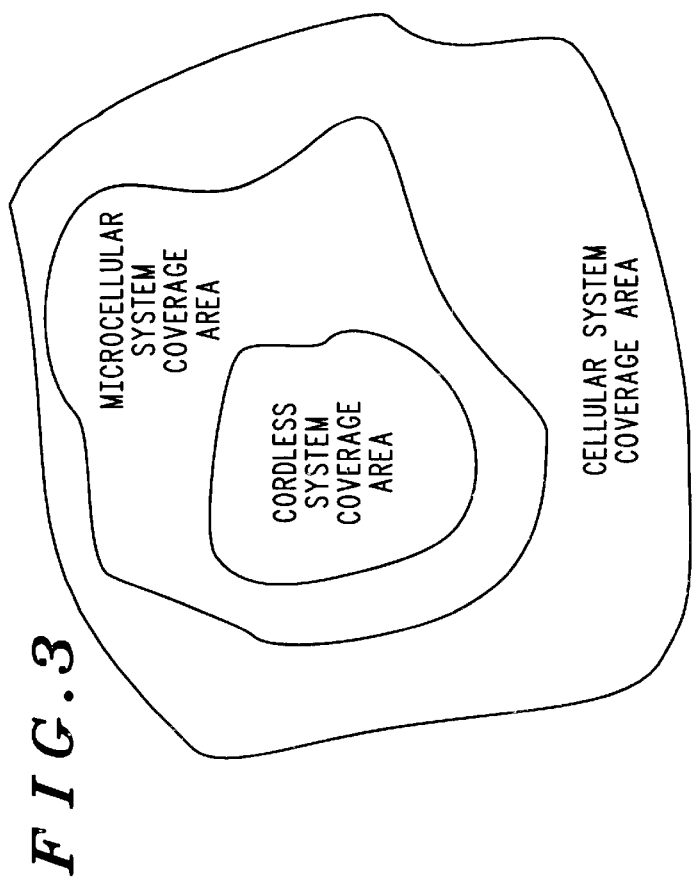
FIG. 3 is a diagrammatical map which shows a typical arrangement of coverage areas for the cordless, microcellular and cellular systems.

FIG. 3 shows a typical arrangement of coverage areas for the cordless, microcellular and cellular systems. The cordless system coverage area is the smallest and resides within the microcellular system. The microcellular system has intermediate coverage and resides within the cellular system. The coverage area of each system may depend upon but is not limited to the number of base stations in each system, antenna height of each base station and the power level used by each system. The user of the portable radiotelephone may relocate between the various coverage areas. The portable radiotelephone may change between systems based on but not limited to portable radiotelephone location, system availability, and user preference.

The coverage areas of the systems are not limited to the particular arrangement as shown in FIG. 3. A coverage area may be independent of another coverage area or may partially overlap one or more other coverage areas.

The cordless base station 115, conceptually, is a subminiature cellular system providing a single signaling channel which transmits outbound data messages in a fashion analogous to a conventional cellular outbound signaling channel, and receives service requests from a remote unit, such as a PCC 101. Proper service requests are granted with an assignment of a voice channel (made via the control channel) on the same or a second radio frequency to which the PCC 101 is instructed to tune for its telephone call.

Figure 4:
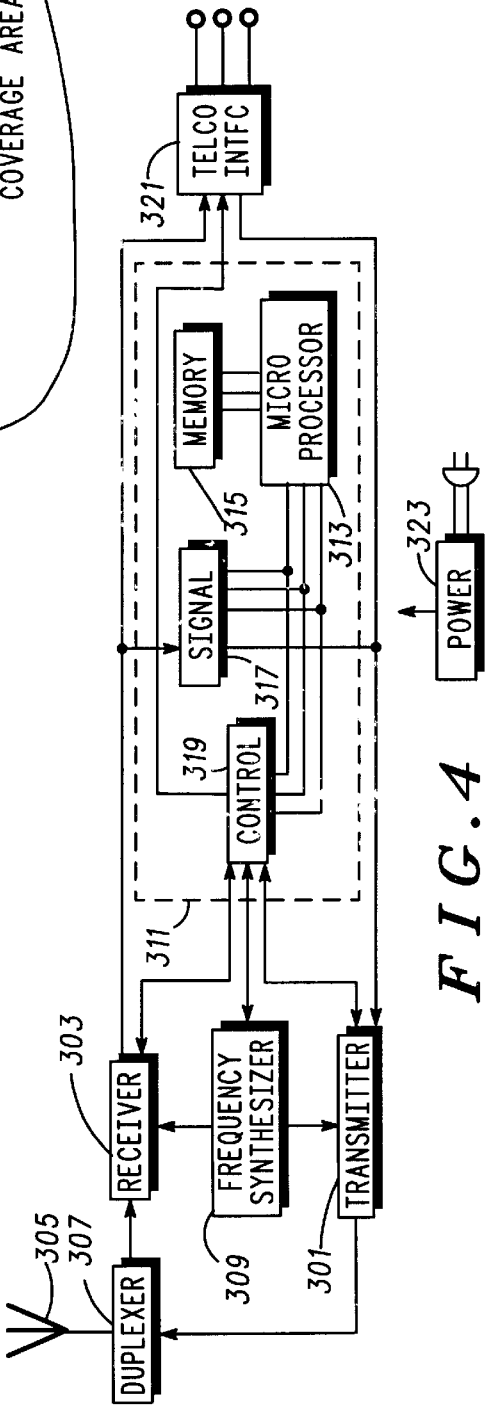
FIG. 4 is a block diagram of a cordless base station which may employ the present invention.

The basic implementation of a cordless base station is shown in FIG. 4. A conventional transmitter 301 and a conventional receiver 303 suitable for use in the 869 to 894 MHz and 824 to 849 MHz band of frequencies, respectively, being used for conventional cellular services, are coupled to a common antenna 305 via a duplexer 307. The power output of the transmitter 301 is limited to approximately 6 milliwatts so that interference to other services and other cordless telephone stations is minimized. The channel frequency selection is implemented by a frequency synthesizer 309 controlled by a logic unit 311. Within the logic unit 311 is a microprocessor 313, such as a 68HC11 available from Motorola, Inc., or similar microprocessor, which is coupled to conventional memory devices 315 which store the microprocessor operating program, base identification (BID) and customizing personality, and other features. Received and transmitted data is encoded/decoded and coupled between the receiver 303, the transmitter 301, and the microprocessor 313 by signaling interface hardware 317. The microprocessor instructions are conveyed and implemented by control hardware 319. Interface with the user's home landline telephone line is conventionally accomplished via a TELCO interface 321. Power is supplied from the conventional AC mains and backed-up with a battery reserve (all depicted as power 323).

Figure 5:
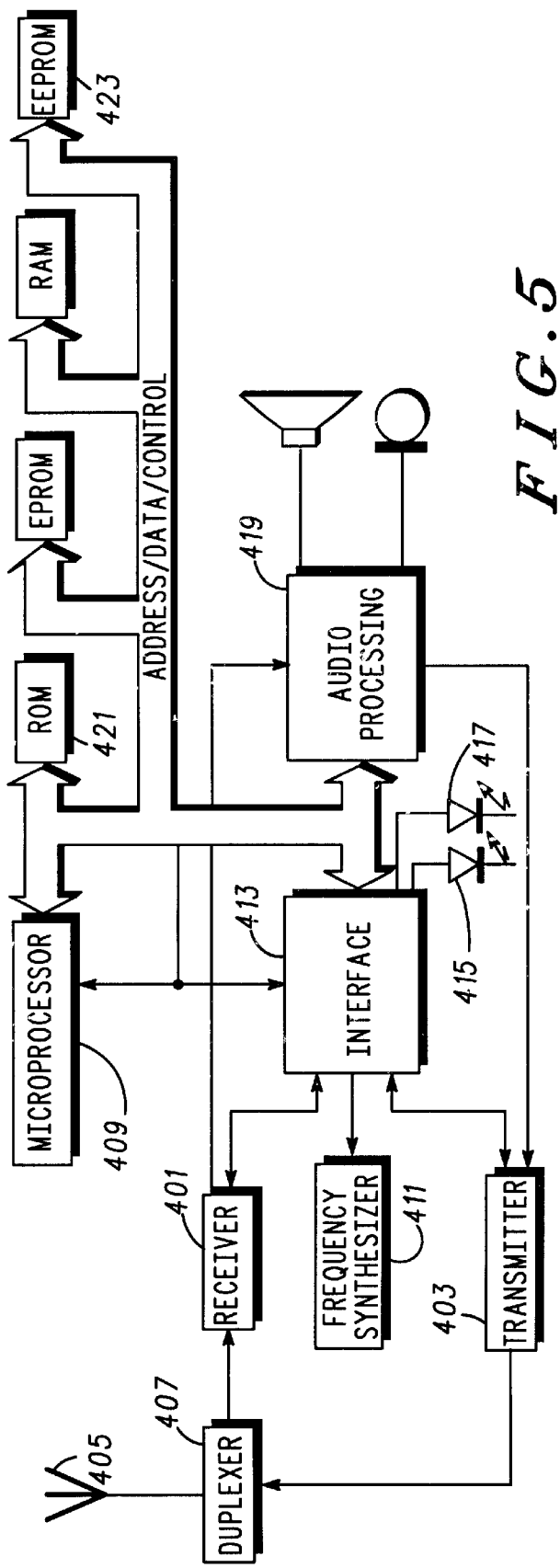
FIG. 5 is a block diagram of a portable radiotelephone which may employ the present invention.

The PCC 101 is a portable radiotelephone transceiver which is shown in block diagram form in FIG. 5. A portable radio receiver 401, capable of receiving the band of frequencies between 869 and 894 MHz, and a portable transmitter 403, capable of transmitting with low power (approximately 6 milliwatts in the preferred embodiment) on frequencies between 824 and 849 MHz, are coupled to the antenna 405 of the PCC 101 by way of a duplexer 407. The particular channel of radio frequency to be used by the transmitter 403 and the receiver 401 is determined by the microprocessor 409 and conveyed to the frequency synthesizer 411 via the interface circuit 413. Data signals received by the receiver 401 are decoded and coupled to the microprocessor 409 by the interface circuit 413 and data signals to be transmitted by the transmitter 403 are generated by the microprocessor 409 and formatted by the interface 413 before being transmitted by the transmitter 403. Operational status of the transmitter 403 and the receiver 401 is enabled or disabled by the interface 413. The interface also controls light emitting diodes, 415 and 417, which are used to indicate to the user which system the PCC 101 is currently receiving. Control of user audio, the microphone output and the speaker input, is controlled by audio processing circuitry 419.

In the preferred embodiment, the microprocessor 409 is a 68HC11 microprocessor, available from Motorola, Inc., and performs the necessary processing functions under control of programs stored in conventional ROM 421. Characterizing features of the PCC 101 are stored in EEPROM 423 (which may also be stored in the microprocessor, on-board EEPROM) and include the number assignment (NAM) required for operation in a conventional cellular system and the base identification (BID) required for operation with the user's own cordless base.

The transmitter 403 of the PCC 101 has the capability of transmitting with the full range of output power which is required for operation in a conventional cellular system. This range of output power consists of six sets of output power magnitude ranging from a high output power level of approximately 600 milliwatts to a low output power level of 6 milliwatts. This six set range of output power is enabled when the PCC 101 is in the cellular system mode.

According to the preferred embodiment of the present invention, the same PCC 101 is compatible with both the cordless and cellular telephone system 103. This is accomplished by enabling the PCC 101 to operate in both a cordless and cellular telephone system 103 using only cellular telephone frequencies.

The radiotelephone arrangement has desirable advantages for the user. The PCC 101, in combination with the cordless base station 115, can automatically route, via the ACRE 117, an incoming call to the telephone system in which the PCC 101 is located without inconveniencing the user. The TELCO 14, in combination with the ACRE 117, can automatically route an incoming call to the PCC 101 without inconveniencing the user.

Figure 6:
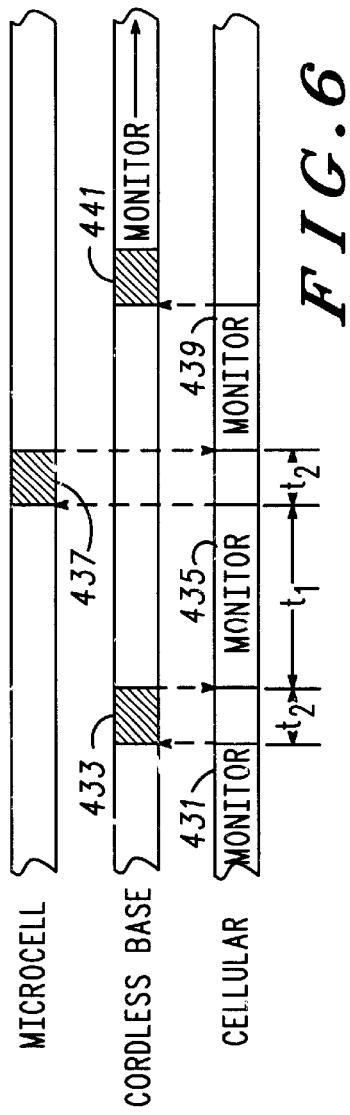
FIG. 6 is a timing diagram of the system scanning process which may be employed in the portable radiotelephone of FIG. 5.

The priority established for the PCC 101 is that the cordless base station 115 is the first desired path for a user's telephone call and the conventional cellular (or the microcell system) is the second choice, the process of implementing that priority is shown in FIG. 6. The depiction in FIG. 6 is of the PCC receiver's 401 reception of the outbound signaling channel or set of signaling channels transmitted from the cellular system, the cordless base, and the microcellular system relative to time. This diagram aids in the understanding of the unique scanning priority feature of the present invention.

The PCC receiver 401 can be monitoring 431 the outbound message stream being transmitted from the cellular system signaling channel (which was selected from among the plurality of cellular signaling channels in conventional fashion). At the appropriate time, the PCC receiver 401 is instructed by its microprocessor 409 to tune to the frequency or one of the frequencies being used by the cordless base station 115 as a signaling channel. The PCC receiver 401 scans 433 the cordless base outbound signaling channel or channels for a period of time $t_2$. If the signaling data stream is not received with sufficient quality, the PCC receiver 401 is returned to the previously selected signaling channel of the cellular system 103. It remains tuned to this signaling channel 435 for a period of time, $t_1$, before attempting another scan of a signaling channel of one of the alternative systems. The relationship of $t_1$ and $t_2$ is such that a cellular page message (that is, a radiotelephone call or other transmitted requirement) which is repeated, conventionally, after a 5 second pause will not be missed because the PCC receiver 401 was scanning an alternative system during both cellular page message transmission times. The time $t_1$ must be greater than the sum of the pause between the two pages and the typical time to transmit two pages. The time $t_2$ must be less than the time between the two pages. If the pause time is 5 seconds and the typical time to transmit a page is 185.2 milliseconds, $t_1$ must be greater than the 5.3704 seconds and $t_2$ must be less than 5 seconds. After monitoring the cellular system signaling channel for a time $t_1$, the PCC receiver 401 may be instructed to tune to the signaling channel or to the signaling channels, sequentially, of the microcell system, as shown at 437. If an adequate microcell signaling channel is not found during the scan of predetermined signaling channel frequencies, the PCC receiver 401 retunes to the cellular system signaling channel, as shown at 439.

A scan to the signaling channels, 441, of the cordless base station 115 which discovers a signaling data stream meeting appropriate quality requirements results in the PCC receiver 401 continuing to monitor the cordless signaling channel. The PCC receiver 401 remains on the cordless signaling channel without rescanning to another system until the PCC 101 cannot receive the cordless base's transmitted signal for a continuous 5 second period of time.

The effect of this priority process is to give priority to the cordless base station 115 at the PCC 101. Once the signaling channel of the cordless base station 115 is discovered, the PCC 101 remains tuned to this channel. Thus, when the PCC 101 is initially tuned to the cellular system it will automatically switch to the cordless base station when it is possible to access the cordless base station. Once the PCC receiver 401 has found the cordless base signaling channel, it remains tuned to that channel. When the PCC transceiver is first turned on, its first scan of signaling channels is the reestablished signaling channel or channels of the cordless base station 115. Of course, the user may override the automatic priority scanning hierarchy by entering an override code into the PCC 101. In this manner, the user may force the scanning of the cellular system signaling channels only, the cordless base signaling channels only, the microcellular system signaling channels only, or combinations of the systems. The user may also perform a call origination with a one time override to the system of his choice.

Once the signaling channel of a system is being monitored, a visual indication is given to the PCC transceiver user. In the preferred embodiment, this indicator is a set of light emitting diodes (LEDs) 415, 417, one of which uniquely illuminates to indicate to which system the PCC transceiver is tuned. Other indicators may alternately be used to convey the same information. For example, a system identifier may appear in the number display of the PCC 101, or a flashing symbol (having different rates of flashing) may be used. Nevertheless, this indication enables the user to determine which system he is in and decide whether he wishes to complete a radiotelephone call in the indicated system.

In order for the PCC 101 to communicate with the cordless base station 115 it must be authorized to use a particular channel. Authorization is required since the licensee of the cellular spectrum is required by the FCC to maintain control of its transmitters. The cordless base station 115 is programmed to update its authorization periodically. To do this the personal base station 115 initiates a phone call to the ACRE 117. The ACRE 117 responds with a connect message 502 (see FIG. 7) which contains a first random number that will be used in the authentication process. The cordless base station 115 responds with an authentication message 504. The authentication message 504 contains a cordless base station ID, a first authentication result calculated using the first random number, and a second random number. The ACRE 117 responds with a authorization and authentication message 506, which contains a second authentication result calculated using the second random number, and information describing which channels the cordless base station 115 can communicate over with the PCC 101. The cordless base station 115 responds with a registration message 507 which contains the PCC's 101 mobile identification number. The registration message 507 is only sent when a PCC 101 is in range of the cordless base station 115. The registration message 507 informs the ACRE 117 to route the calls to the PCC 101 to the cordless base station 115. The ACRE 117 responds by sending a registration acknowledge message 508 to the cordless base station 115, which informs the cordless base station 115 that the registration message 507 was received. The cordless base station 115 then responds with a release message 509, which indicates if the authorization message sequence was successful.

Figure 8:
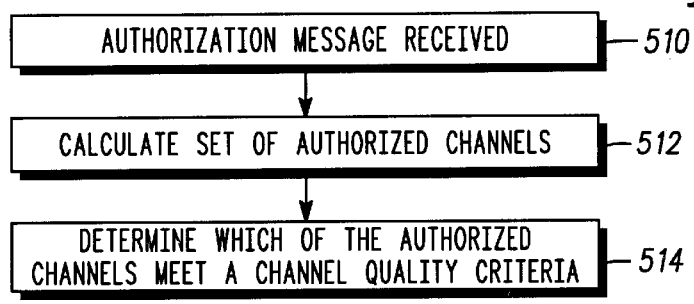
FIG. 8 is a flow chart the cordless base station of FIG. 4 may employ to determine which channel to use in communicating with the radiotelephone of FIG. 5.

In FIG. 8 the cordless base station 115 determines which of the authorized channels to use in communicating with the PCC 101. In block 510 the authorization message 506 is received by the cordless base station 115. Then the cordless base station 115 calculates a set of authorized channels from the information in the authorization message 506, as shown in block 512. Next, the cordless base station 115 only communicates on those channels which are authorized and meet a channel criteria as shown in block 514. The process of determining if a channel meets a quality criteria is described in FIGS. 9–11.

The channel quality criteria test, shown in block 514, can be performed in a number of ways. For instance, a minimum channel criteria can be set and only a channel which meets this minimum criteria will be available for communication. This implementation is shown in greater detail in FIGS. 9 and 10. Another way of determining a channel quality criteria is to only communicate over the channel which has the best channel quality. This process is described in FIG. 11.

Figure 9:
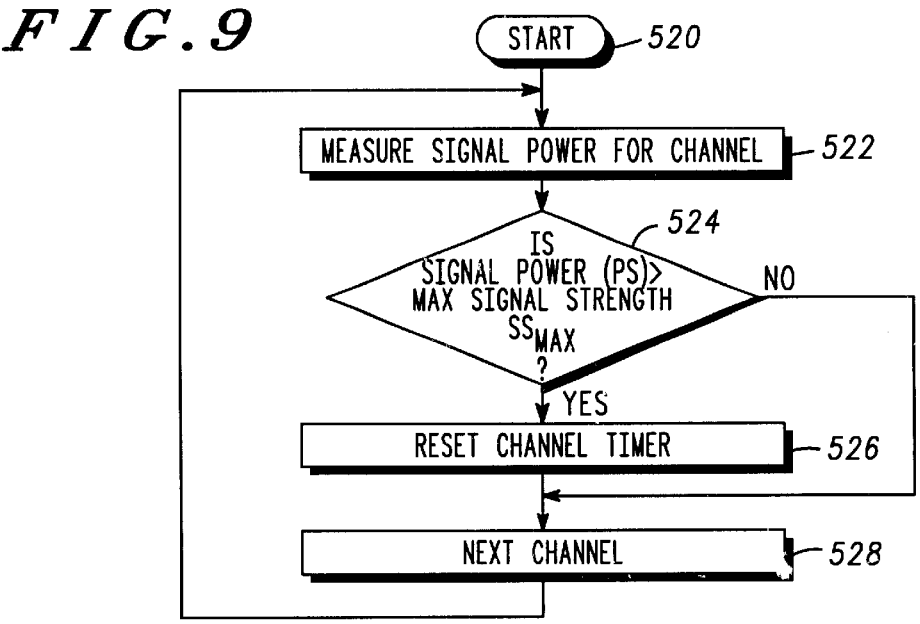
FIG. 9 is a flow chart the cordless base station of FIG. 4 may employ in combination with the flow chart of FIG. 10 to determine which channels meet a minimum channel criteria.
Figure 10:
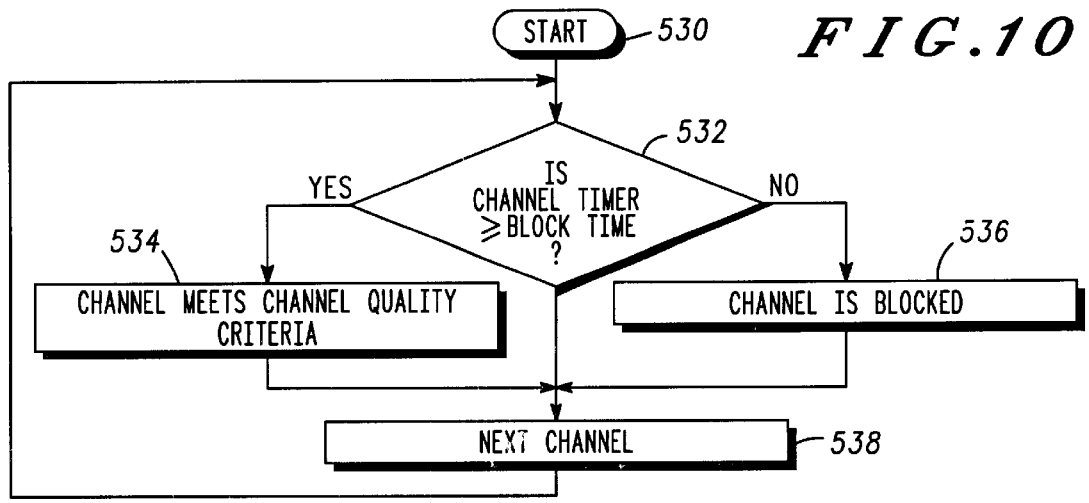
FIG. 10 is a flow chart the cordless base station of FIG. 4 may employ in combination with the flow chart of FIG. 9 to determine which channels meet a minimum channel criteria.

One implementation of the process of determining if a channel meets a minimum channel criteria is shown in FIGS. 9 and 10. The process starts at block 520. The interfering signal power for a channel is measured in block 522. This signal power is compared against a threshold or maximum signal strength at block 524. If the signal power exceeded the maximum then a timer associated with the channel is started or reset at block 526, and the next channel is selected at block 528. If the maximum signal strength was not exceeded at block 524 the next channel is selected at block 528. Processing for the next channel then starts over at block 522. By this process it can be determined how long it has been since the maximum interfering signal strength has been exceeded for each channel.

In FIG. 10 this information is used to determine which channels meet the channel quality criteria as required in block 514 of FIG. 8. The algorithm starts at block 530. Then it is determined if the channel timer is greater than or equal to a block time at block 532. If yes then the channel meets the channel quality criteria, at block 534, and is available for use in communication between the cordless base station 115 and the PCC 101. If no then the channel is blocked, at block 536, and the channel is not available for use in communication between the cordless base station 115 and the PCC 101. The process starts over with the next channel at block 538.

To those skilled in the art it would be obvious to make a number of changes in this process without deviating from the scope of invention. Such modification could include measuring the bit error rate (BER) for a channel in block 522 of FIG. 9 and determining if it is greater than a maximum allowable BER. Other parameters could be measured such as received signal strength or a combination of these could be used. Also the block time in block 532 of FIG. 10 could be set to zero, so that a channel need only meet the test of block 524 of FIG. 9 instantaneously.

Figure 11:
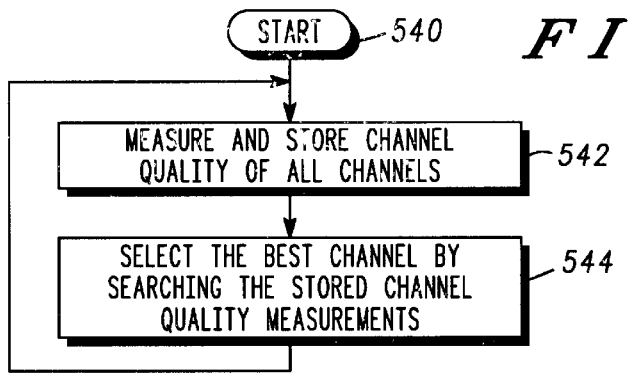
FIG. 11 is a flow chart the cordless base station of FIG. 4 may employ in determining which channel has the best channel quality.

FIG. 11 describes a best channel algorithm and starts at block 540. Next the channel quality is measured and stored for all channels, at block 542. This measure could be interfering signal strength, BER or received signal strength or some combination of these. At block 544, the channel having the best channel quality is selected. The selected channel would be the best channel and the channel over which the cordless base station 115 would communicate with the PCC 101. The process is then repeated starting at block 542.

The cordless base station 115 may select between the minimum channel criteria algorithm of FIGS. 9 and 10 and the best channel algorithm of FIG. 11 based upon information contained in the authorization and authentication message 506. In one implementation, the minimum channel criteria algorithm is favored when the authorized channels are shared with services other than cordless, while the best channel algorithm is favored when the authorized channels are used only for cordless service.

Figure 12:
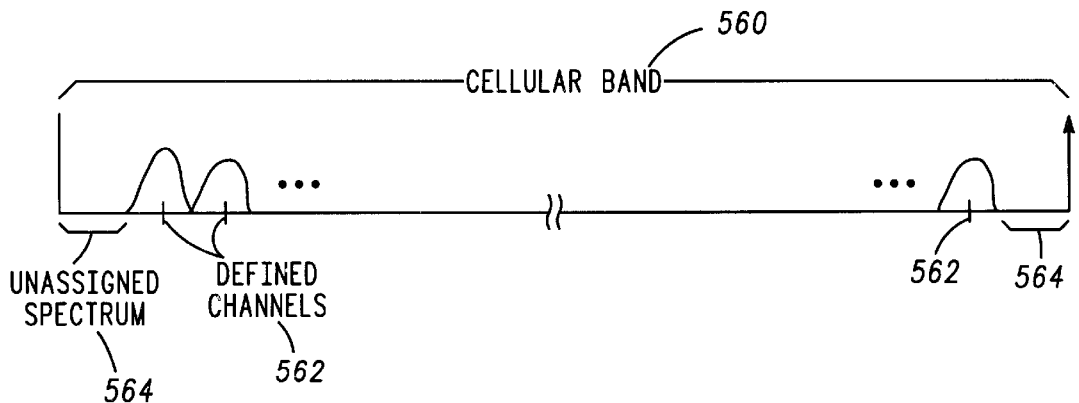
FIG. 12 is a simplified graph of the cellular spectrum.

One of the interesting features of the cordless base station 115 is that it is designed to operate on three channels that are not shared with the cellular communication system. This is illustrated in FIG. 12, which shows a band of frequencies 560 or cellular band that is allocated by the FCC to a cellular system provider. The FCC also defines the channels 562 (cellular channels) within the band over which cellular communication can occur. This set of channels leaves some of the frequency band 560 unassigned to a channel. The cordless base station 115 uses this unassigned frequency 564 to define three unshared channels, two at the lower end of the spectrum and one at the high end of the spectrum, over which the cordless base station 115 can communicate with the PCC 101. These three channels can be used by cordless base station 115 when none of the channels meet minimum channel criteria as set out in FIGS. 9 and 10. These channels can also be used when none of the channels have been authorized as in FIG. 8.

A problem can occur upon initial power up of a cordless base station 115 using a minimum channel criteria algorithm where the channel must meet a criteria for a set period of time before being available for use. The problem occurs upon initial power up or any initialization event when the set of authorized channels is suddenly changed. When this occurs it is impossible to know if a channel has been exceeding a minimum channel criteria or for how long it has been exceeding a minimum channel criteria. Therefore at power up, an assumption must be made: either all the channels meet the criteria required in block 514 of FIG. 8; or none of the channels meet the criteria required in block 514 for a predetermined period of time. These two assumption are shown in FIGS. 13 and 14. In FIG. 13 power up occurs at block 570. Then all the channel timers are reset at block 572. Then the authorization message is received, at block 574, which corresponds with block 510 of FIG. 8. Since the timers were reset, none of the channels will exceed the block time at block 532 of FIG. 10 for a least a period equal to the block time. Thus the assumption in FIG. 13 is that none of the channels meet the channel criteria upon power up.

FIG. 14 shows the initial power up of the cordless base station 115 in block 576. The initial power could be replaced by any initialization event as described earlier with respect to FIG. 13. The base station 115 then receives the authorization message at block 578. Then all the channel timers are set to the block time at block 580. Thus the channels are assumed upon power up of the cordless base station to have met the channel criteria for the requisite period of time as shown in block 532 of FIG. 10.

Turning now to FIG. 15, the process for authenticating the cordless base station 115 and ACRE 117 is shown. The process for authenticating starts at step 602. According to the process of the present invention, the ACRE authenticates the cordless base station to operate in the communication system at a step 603 upon initiation of a call, and the cordless base station separately authenticates the ACRE to operate in the communications system at a step 604. In the first step 605, the cordless base station authentication process is started. If the cordless base station is not authenticated at step 606, the authentication process is ended at step 608. If the cordless base station is authenticated at step 606, the ACRE authentication process is started at step 610. If the ACRE is not authenticated at step 612, the authentication process is ended at step 608. However, if the ACRE is authenticated, a communication link is enabled at step 614. In a step 615, a wireline interface key (WIKEY) which is used in the authentication process for both the cordless base station and the ACRE may optionally be updated. The use of a WIKEY in the authentication process for the cordless base station and ACRE will be described in detail in reference to FIGS. 16 through 20.

Figure 7:
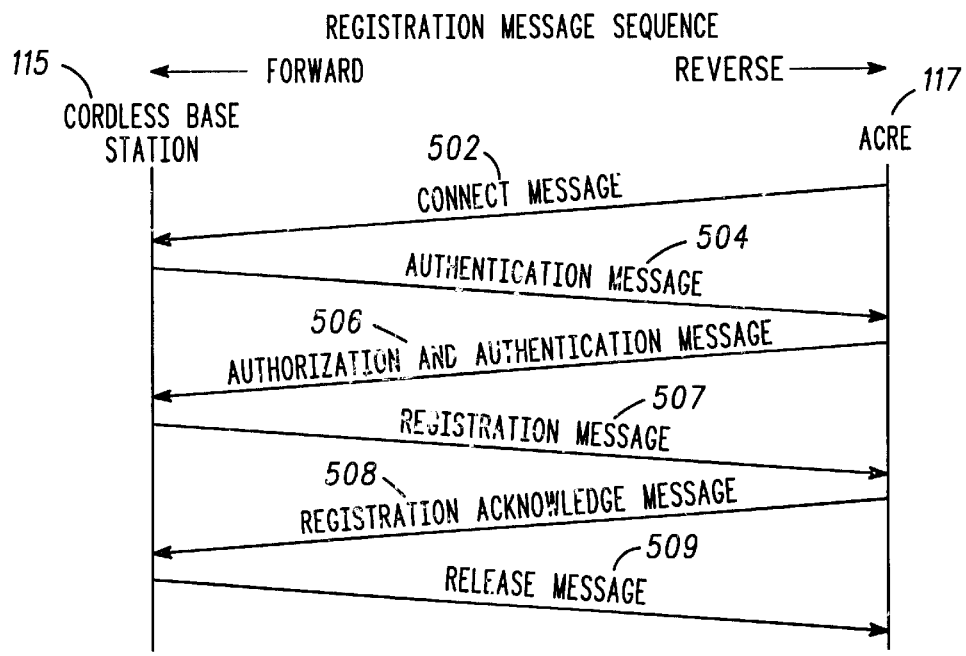
FIG. 7 is a timing diagram of the registration message sequence.

While the authentication process of FIG. 15 shows the cordless base station authentication process followed by the ACRE authentication process, it will be understood that these processes could occur in the reverse order, or simultaneously. For example, as shown in FIG. 7, the authentication processes occur simultaneously wherein authentication message 504 of FIG. 7 may include a cordless base station authentication result generated at step 606 and also an ACRE authentication request at step 610.

Figure 16:
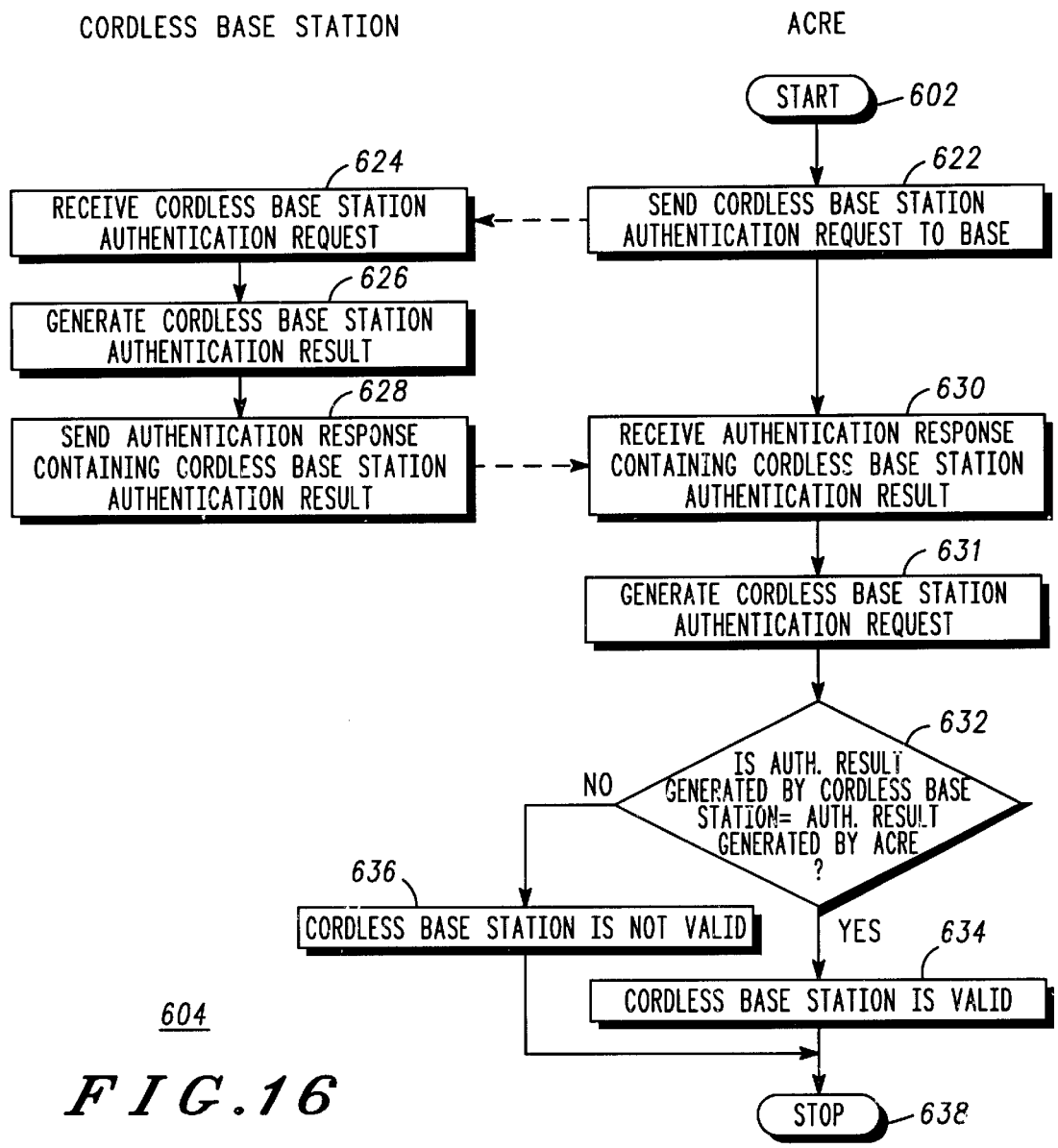
FIG. 16 is a block diagram of the process for authenticating the cordless base station.

Turning now to FIG. 16, the cordless base station authentication process is shown. At step 622, the ACRE sends a cordless base station authentication request to the cordless base station. The cordless base station authentication request could be included in connect message 502 of the general signaling protocol of FIG. 7. The cordless base station receives the authentication request at step 624. At a step 626, the cordless base station generates a cordless base station authentication result. At a step 628, the cordless base station sends an authentication response containing the cordless base station result to the ACRE. The authentication response is received at the ACRE at a step 630. The authentication response could be included in authentication message 504 (of FIG. 7) and preferably includes cordless base station information, such as a cordless base station identification uniquely associated with the cordless base station. However, it will be understood that the cordless base station identification could already exist at the ACRE or could be sent as a separate message at a different time. At a step 631, the ACRE independently generates a cordless base station authentication result. The process for generating a cordless base station authentication result generated at steps 626 and 631 in detail in reference to FIG. 17.

At a step 632, the ACRE determines whether the cordless base station authentication result generated by the cordless base station is equal to the cordless base station authentication result generated by the ACRE. If the authentication results are equal, the cordless base station is determined to be valid at a step 634. However, if the authentication results are not equal, the cordless base station is determined to be not valid at a step 636. The cordless base station authentication process is ended at a step 638.

Figure 17:
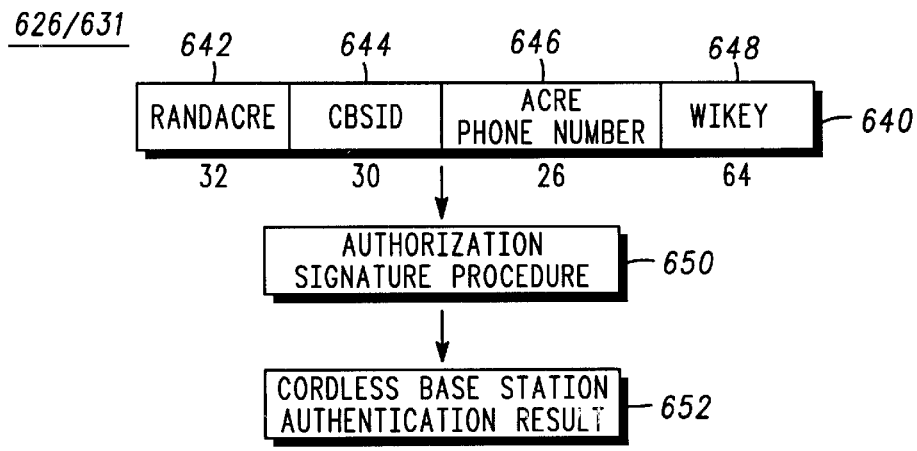
FIG. 17 is a block diagram of the process for generating a cordless base station authentication result shown in steps 626 and 631 of FIG. 16.

Turning now to FIG. 17, the preferred process for generating a cordless base station authentication result (shown generally at steps 626 and 631 of FIG. 16) is shown in detail. In generating an authentication result, inputs 640 including RANDACRE 642 (a random number generated by the ACRE), the cordless base station identification (CBSID) 644, the ACRE phone number 646, and a wireline interface key (WIKEY) 648 are required. Preferably, the authorization signature procedure 650 uses inputs 640 to generate the cordless base station authentication result 652. Many different algorithms would be suitable for this authorization signature procedure as long as the algorithm makes it difficult to determine WIKEY 648 given a set of values for RANDACRE 642, CBSID 644, ACRE phone number 646, and cordless base station authentication result 652. This is possible since the WIKEY, which is preferably 64 bits long, has a substantially larger number of possible combinations than the cordless base station authentication result, which is preferably 18 bits long. In other words, there are a large number of WIKEY values which will generate the same cordless base station authentication result given a set of values for RANDACRE, CBSID, and ACRE phone number.

The characteristic of the authorization signature procedure described above is desirable since someone skilled in the art who knows WIKEY 648, the CBSID 644, which is associated with the WIKEY, and the authorization signature procedure 650 could build a fraudulent device. Because the authorization signature procedure 650 could be discovered by an unauthorized user and it is inconvenient to change this algorithm in cordless base stations which have been proliferated, the WIKEY 648 is the primary means of security. Therefore, the confidentiality of this number must be protected by the algorithm.

Figure 18:
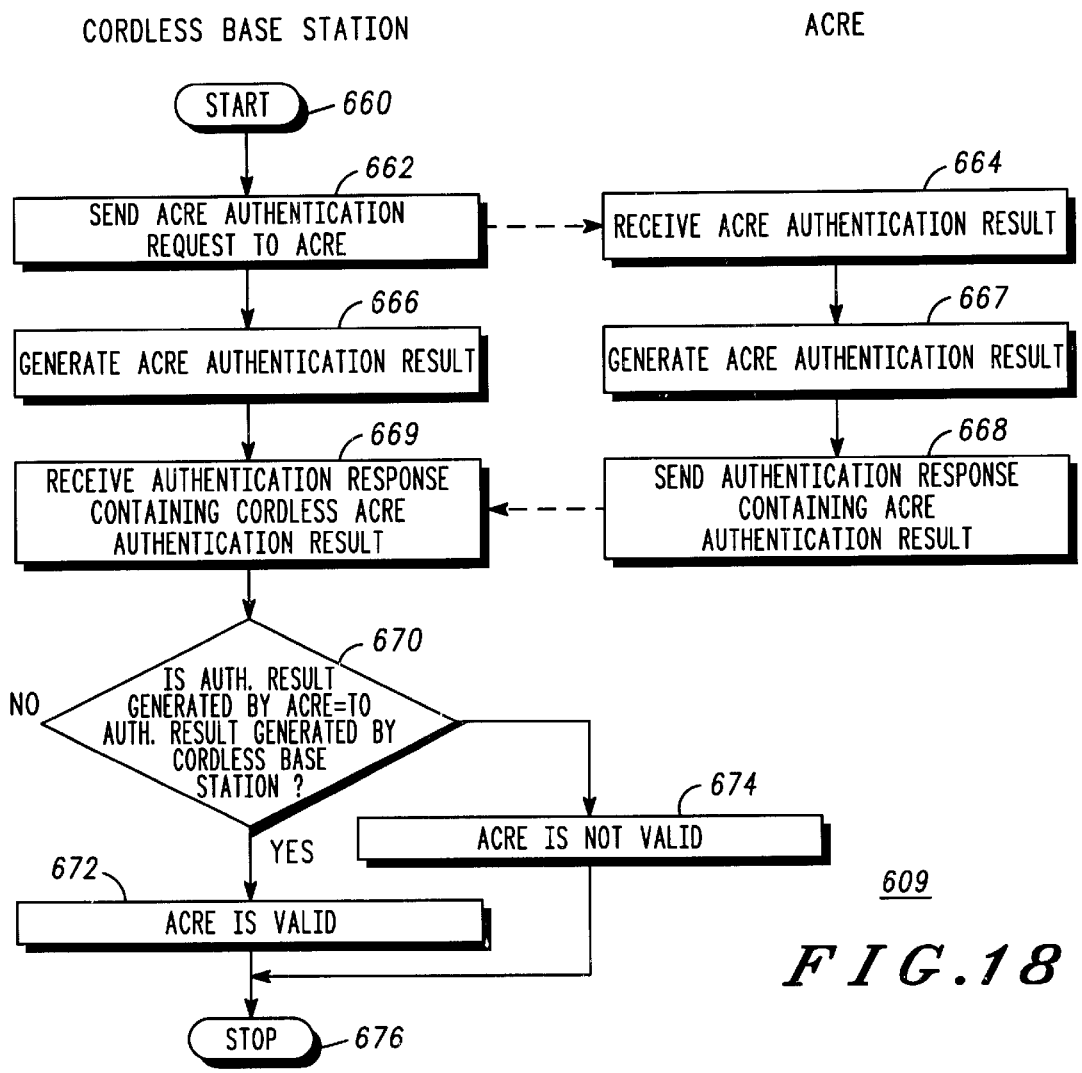
FIG. 18 is a block diagram of the process for authenticating the ACRE.

Turning now to FIG. 18, the ACRE authentication process is shown. In a step 662, an ACRE authentication request is sent from the cordless base station to the ACRE. The ACRE authentication request could be included, for example, in authentication message 504 of FIG. 7, or could be sent as a separate message. The authentication request is received by the ACRE at a step 664. At a step 666, the cordless base station and at a step 667, the ACRE independently generate an ACRE authentication result. The generation of the ACRE authentication result will be described in detail below in reference to FIG. 19. In a step 668, the ACRE sends an authentication response containing the ACRE authentication result generated by the ACRE. The authentication response could be included in authorization and authentication massage 506 of FIG. 7. The authentication response is received by the cordless base station at a step 669. In a step 670, the cordless base station determines whether the ACRE authentication result generated by the ACRE is equal to the ACRE authentication result generated by the cordless base station. If the authentication results are equal, the ACRE is determined to be valid at a step 672. However, if the ACRE authentication results are not equal, the ACRE is determined to be not valid at a step 674. The ACRE authentication process is ended at a step 676.

Figure 19:
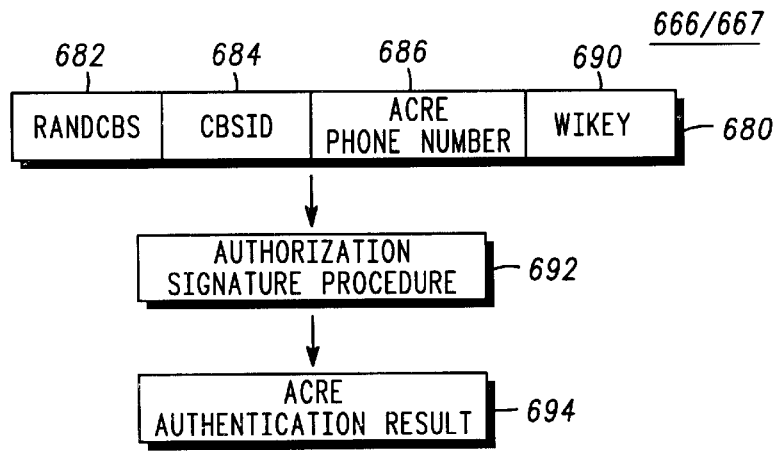
FIG. 19 is a block diagram of the process for generating an ACRE authentication result shown in steps 666 and 667 of FIG. 18.

Turning now to FIG. 19, the authorization signature procedure 692 utilizes the inputs 680 to generate the ACRE authentication result 694. The inputs include the random number RANDCBS 682, CBSID 684, ACRE phone number 686, and WIKEY 690. The authorization signature procedure 692 works in the same fashion and has the same characteristics as the authorization signature procedure 650 which is shown in FIG. 17.

Figure 20:
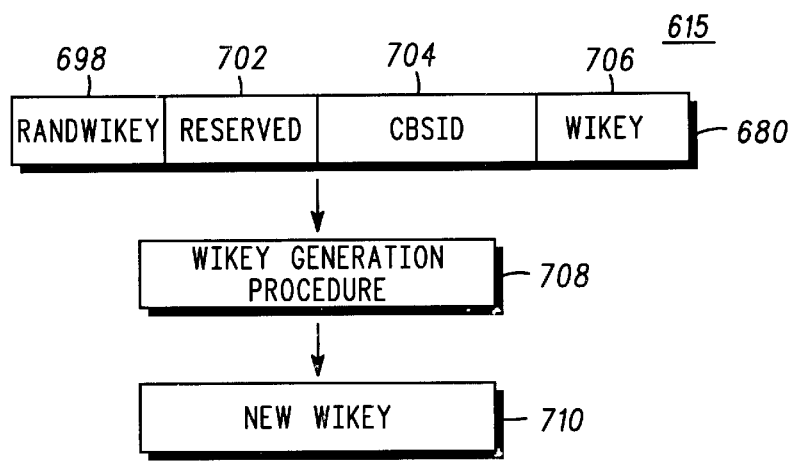
FIG. 20 is a block diagram of the process for updating the wireline interface key (WIKEY).
Figure 21A:
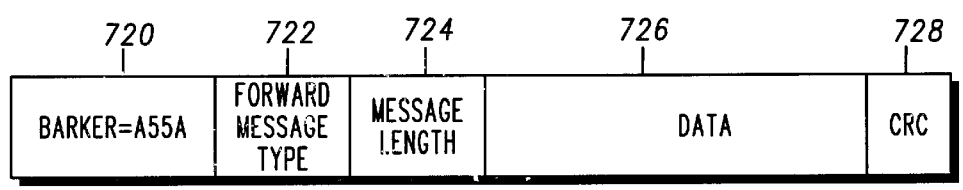
FIG. 21 shows the signal protocol for signals transmitted between the cordless base station and the ACRE.
Figure 21B:
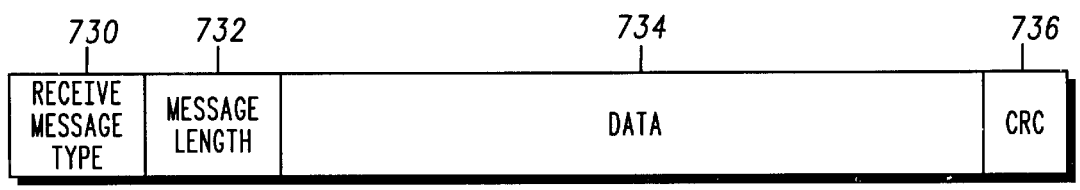
Figure 21C:
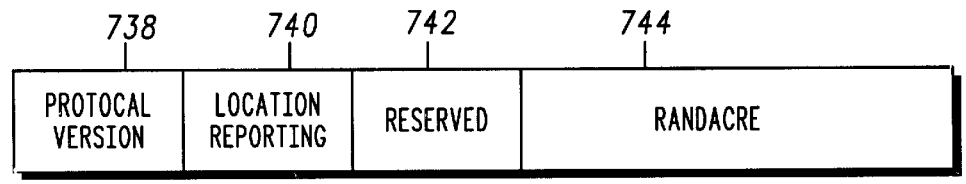
Figure 21D:
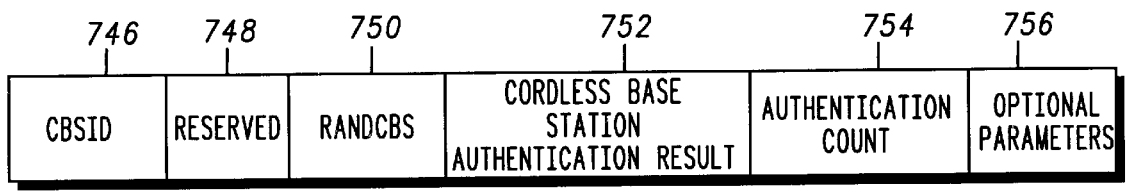
Figure 21E:
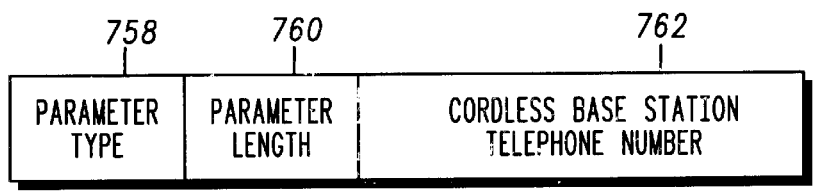
Figure 21G:
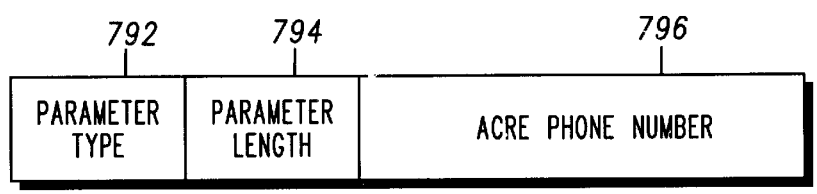
Figure 21H:
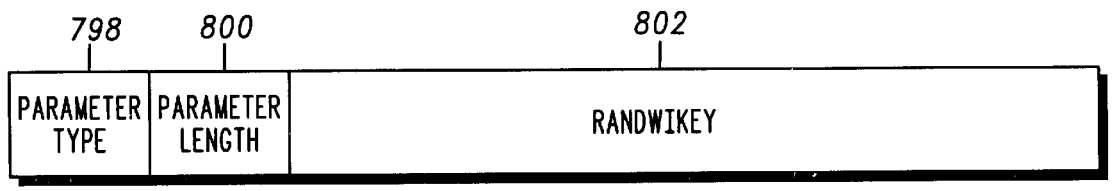

In FIG. 20, the WIKEY generation procedure 708 utilizes the inputs 696 to generate a new WIKEY 710. The inputs to this algorithm include a random number RANDWIKEY 698, Reserved 702, CBSID 704, and WIKEY 706. The WIKEY generation procedure 708 also works in the same fashion and has the same characteristics as the authorization signature procedure 650 (shown in FIG. 17) to generate a new WIKEY. Although these algorithms need to have the same characteristics as authorization signature procedure 650, they do not need to be the same algorithms.

The WIKEY generation procedure 708 is unique since it utilizes the original WIKEY value 706 in combination with the random number RANDWIKEY 698 to generate a new WIKEY value 710. If someone were to obtain a WIKEY value, the ACRE could generate a new WIKEY on the next phone call. As long as the person did not obtain the RANDWIKEY 698 during that call, it would be very difficult to determine the new WIKEY value based upon the original WIKEY value. This has the advantageous effect of making the original WIKEY value useless for purposes of construction of a fraudulent cordless base station.

Turning now to FIG. 21, the preferred signaling protocol for communicating between the cordless base station and the ACRE is shown. For ease of understanding, the signals will be described with reference to the messages shown in the general signaling protocol of FIG. 7. However, before describing some specific messages which may be transmitted, the general forward signaling protocol from the ACRE to the cordless base station and the reverse signaling protocol from the cordless base station to the ACRE will be described. In particular, the forward signaling format is shown in FIG. 21-A. A signal from the ACRE to the cordless base station includes a barker field 720, a forward message type 722, a message length field 724, a data field 726, and a cyclic redundancy code (CRC) field 728. Because fields 720, 722, 724, and 728 are included in all signals transferred from the ACRE to the cordless base station, only the data field 726 will be described in reference to specific messages transferred from the ACRE to the cordless base station. FIG. 21-B generally shows the reverse signaling format. In particular, signals sent from the cordless base station to the ACRE include a reverse message type field 730, a message length field 732, a data field 734, and a CRC field 736. Because all messages transferred from the cordless base stations to the ACRE include fields 730, 732, and 736, only data field 734 will be described in reference to specific signals from the cordless base station to the ACRE.

Having described the general signaling format in the forward and reverse direction, data fields of specific signals will be described. In particular, FIG. 21-C shows the data field of a preferred connect message 502 from the ACRE to the cordless base station. The preferred connect message includes a protocol version field 738 which indicates the version of a wireline interface specification which is supported by the ACRE and which would be utilized by the cordless base station to determine the level of support provided by the ACRE. The connect message preferably also includes a location reporting field 740 which determines if the cordless base station should identify its location by transmitting the optional parameter containing cordless base station telephone number optional parameter in the cordless base station authentication message (described below in reference to FIGS. 21-F and 21-G). The connect message also includes a reserved field 742 for future signaling bits. Finally, the connect message 744 includes RANDACRE which is a 32-bit random number generated by the ACRE (described above in reference to FIG. 17) and is used in the generation of the cordless base station authentication result described earlier.

The data field for authentication message 504 of FIG. 7 is shown in FIG. 21-D. In particular, the authentication message includes a cordless base station identification field 746 which uniquely identifies the individual cordless base station connected in the communication system. The authentication message also includes a reserved field 748 for future signaling bits. A field 750 includes a random cordless base station signal (RANDCBS) generated by the cordless base station. The RANDCBS field is used to generate the ACRE authentication result as described above in FIG. 19. Field 752 includes the cordless base station authentication result generated at step 652 of FIG. 17. Field 754 is an authorization count field. The authorization count preferably contains a modulo-64 counter which is utilized to count the number of successive authorizations. Finally, field 756 is available for option parameters. One example of an optional parameter is shown in FIG. 21-F which includes a field 758 for parameter type and field 764 parameter length, and a field 762 to transmit the cordless base station telephone number.

Turning now to FIG. 21-F, the data field for the authentication and authorization message (shown as message 506 in FIG. 7) is shown. In particular, the authorization and authentication message includes an ACRE authentication result field 764, as shown generated at step 694 of FIG. 19. The ACRE authentication result is generally compared to an ACRE authentication result generated by the cordless base station to determine whether the ACRE is authenticated to operate in the communication system. A usage-allowed field is also included to indicate if the cordless base station is authorized to shared spectrum, such as allocated cellular spectrum. A spectrum usage field 768 is also included to indicate if the spectrum which is allocated in the channel allocation array field 778 is utilized by the cellular system. If the spectrum is utilized by the cellular system, the cordless base station will not utilize the channel if it detects activity on the channel. If the spectrum is not utilized by cellular, the cordless base station will utilize the channel which will provide the lowest level of interference.

An authorization initiation field 772 is also provided in the authorization and authentication message. The authorization initiation field indicates when the next authorization should be initiated. A reserved field 774 is also included in the authorization and authentication message, followed by an initial channel number field 776. The initial channel field contains the initial 10 kHz channel number for the channel allocation array. Channel allocation array field 778 indicates the 10 kHz channels which are allowed to be utilized. Each bit in this array preferably corresponds to a given 10 kHz channel number. The left most bit in this array preferably corresponds to the 10 kHz channel specified by the initial channel number. The right most bit in the array corresponds to the 10 kHz channel which is 63 channels above the 10 kHz channel specified by the initial channel number field 776.

The authorization and authentication message also includes a number of data fields related to signal-strength levels. In particular, a maximum cordless base station received signal-strength field 780 indicates the maximum received signal strength which is allowed for utilization of a channel. If the signal strength of the channel is above a predetermined value, the channel is not utilized by the cordless base station. In a like manner, the max PCC received signal strength field 782 indicates the maximum signal power level for the PCC receive frequencies. A block time field 784 indicates the continuous time that the signal strength of the channel must be less than or equal to the maximum signal strength prior to utilization by the cordless base station. A maximum cordless base station transmit level 786 indicates the maximum power level at which the cordless base station can transmit. Similarly, field 788 indicates the maximum PCC transmit power level allowed in the system. Finally, an optional parameter 790 is included in the data field for the authorization and authentication message.

A first example of an optional message is shown in FIG. 21-G. The data field includes a parameter type field 792, a parameter length field 794, and an ACRE phone number 796. A second optional parameter which may be sent is shown in FIG. 21-H. The data field for this optional parameter type field 798, a parameter length field 800, and a RANDWIKEY field 802. RANDWIKEY is used for generating a new WIKEY as described in FIG. 20.

Turning to FIG. 21-I, the registration message (message 507 in FIG. 7) is shown. The registration message includes a registration type field 804, a mobile identification number (MIN) 806, an electronic serial number (ESN) 808, and optional parameters 810. One example of an optional parameter is shown in FIG. 21-J which could be used for multiple phone number call routing. In particular, the optional field would include a parameter field 812, a parameter length field 814, a registration type field 816, a MIN field 818, and an ESN 820.

Registration acknowledge message 508 of FIG. 7 can be sent from the ACRE to the cordless base station by the standard of FIG. 21-L forward signaling format without a data field. Finally, release message 509 of FIG. 7 is shown in FIG. 21-K. Preferably, the release message includes a release reason 822.

While FIG. 21 shows some preferred signals which may be transmitted between the ACRE and the cordless base station, and some preferred fields which could be included in the signals, FIG. 21 is not an exhaustive list of signals which could be transferred, or an exhaustive list of fields which could be included. Also, the bit-length of the various fields could vary and would depend on the preference of a system operator.

In summary, the unique method of the present invention satisfies a need to effectively establish a communication link between a cordless base station and authorization and call routing equipment only when the PCC is allowed to operate on the communication system (i.e. when a user of the PCC has not fraudulently accessed service in a system) and the ACRE is allowed to allocate spectrum of the communication system (i.e. when that the ACRE is not established fraudulently by an operator who is illegally utilizing spectrum). In particular, the method establishes a communication link between a cordless base station and authorization and call routing equipment by transmitting one or more random numbers between the cordless base station and the authorization and call routing equipment to establish the communication link.

We claim:

1. A method for establishing a communication link between a cordless base station and authorization equipment, said cordless base station being coupled to a telephone network and being adapted to communicate with a wireless communication device, the method comprising the steps of:

(i) transmitting a connect message from said authorization equipment to said cordless base station, said connect message having a first random number;

(ii) generating an authentication message having an identification code associated with said cordless base station and a cordless base station authentication result in response to said connect message; and (iii) transmitting said authentication message from said cordless base station to said authentication equipment.

2. A method for establishing a communication between a cordless base station and authorization equipment, said cordless base station being coupled to a telephone network and adapted to communicate with a wireless communication device, the method comprising the steps of:

(i) transmitting an authentication request having an identification code associated with said cordless base station and a random number generated at said cordless base station from said cordless base station to said authorization equipment;

(ii) generating an authenticate result in response to said authentication request;

(iii) transmitting said authentication result from said authorization equipment to said cordless base station.

3. The method for establishing a communication link between a cordless base station and authorization equipment according to claim 1 further including a step of transmitting an authentication request from said cordless base station to said authorization equipment.

4. The method for establishing a communication link between a cordless base station and authorization equipment according to claim 3 wherein said step of transmitting an authentication request comprises a step of transmitting a second random number from said cordless base station to said authentication equipment.

5. The method for establishing a communication link between a cordless base station and authorization equipment according to claim 1 further including a step of generating an authorization equipment authentication result at said authorization equipment.

6. The method for establishing a communication link between a cordless base station and authorization equipment according to claim 5 further including a step of transmitting said authorization equipment authentication result from said authorization equipment to said cordless base station.

7. The method for establishing a communication link between a cordless base station and authorization equipment according to claim 2 further including a step of transmitting a connect message from said authorization equipment to said cordless base station, said connect message having a second random number before said step of transmitting an authentication request.

8. The method for establishing a communication link between a cordless base station and authorization equipment according to claim 7 further including a step of generating a second authentication result in response to said connect message, said second authentication result having a format comprising:
- an identification code uniquely associated with said cordless base station; and
- a cordless base station authentication result.

9. The method for establishing a communication link between a cordless base station and authorization equipment according to claim 8 further including a step of transmitting said second authentication result from said cordless base station to said authentication equipment.

10. A method for establishing a communication link between a cordless base station and authorization equipment, said cordless base station being coupled to a telephone network and being adapted to communicate with a wireless communication device, the method comprising the steps of:
- transmitting a connect message from said authorization equipment to said cordless base station, said connect message having a first random number;
- generating a first authentication result in response to said connect message, said first authentication result having a format comprising:
  - an identification code uniquely associated with said cordless base station; and
  - a cordless base station authentication result;
- transmitting said first authentication result from said cordless base station to said authentication equipment;
- transmitting an authentication request from said cordless base station to said authorization equipment, said authentication request comprising:
  - an identification code uniquely associated with said cordless base station;
  - a second random number generated at said cordless base station;
- generating a second authentication result in response to said authentication request; and
- transmitting said second authentication result from said authorization equipment to said cordless base station.

11. A method for establishing a communication link between a cordless base station and authorization equipment, said cordless base station being coupled to a telephone network and being adapted to communicate with a wireless communication device, the method comprising the steps of:
- (i) transmitting a connect message from said authorization equipment to said cordless base station, said connect message having a first random number; and
- (ii) receiving an authentication message having an identification code associated with said cordless base station and a cordless base station authentication result in response to said connect message.

12. The method for establishing a communication link between a cordless base station and authorization equipment according to claim 11 further including a step of receiving an authentication request from said cordless base station.

13. The method for establishing a communication link between a cordless base station and authorization equipment according to claim 12 wherein said step of receiving an authentication request comprises a step of receiving a second random number from said cordless base station.

14. The method for establishing a communication link between a cordless base station and authorization equipment according to claim 11 further including a step of generating an authorization equipment authentication result.

15. The method for establishing a communication link between a cordless base station and authorization equipment according to claim 14 further including a step of transmitting said authorization equipment authentication result from said authorization equipment to said cordless base station.

16. A method for establishing a communication between a cordless base station and authorization equipment, said cordless base station being coupled to a telephone network and adapted to communicate with a wireless communication device, the method comprising the steps of:
- (i) transmitting an authentication request having an identification code associated with said cordless base station and a random number generated at said cordless base station from said cordless base station to said authorization equipment; and
- (ii) receiving an authenticate result in response to said authentication request.

17. The method for establishing a communication link between a cordless base station and authorization equipment according to claim 16 further including a step of receiving a connect message from said authorization equipment, said connect message having a second random number before said step of transmitting an authentication request.

18. The method for establishing a communication link between a cordless base station and authorization equipment according to claim 17 further including a step of generating a second authentication result in response to said connect message, said second authentication result having a format comprising:
- an identification code associated with said cordless base station; and
- a cordless base station authentication result.

19. The method for establishing a communication link between a cordless base station and authorization equipment according to claim 18 further including a step of transmitting said second authentication result from said cordless base station to said authentication equipment.

* * * * *